United States Patent [19]

Chiang et al.

[11] Patent Number: 4,732,556
[45] Date of Patent: Mar. 22, 1988

[54] APPARATUS FOR SYNTHESIZING AND DENSIFYING MATERIALS USING A SHAPE MEMORY ALLOY

[75] Inventors: Tien-Hon Chiang, El Toro; Donald N. Thatcher, Brea, both of Calif.

[73] Assignee: Aerojet-General Corporation, La Jolla, Calif.

[21] Appl. No.: 937,796

[22] Filed: Dec. 4, 1986

[51] Int. Cl.$^4$ .............................................. B30B 12/00
[52] U.S. Cl. ................. 425/405.2; 148/402; 419/49; 425/78
[58] Field of Search ............ 148/402; 428/906; 419/49, 68; 425/77, 78, 405 R, 405 H; 264/56

[56] References Cited

U.S. PATENT DOCUMENTS

| | | | |
|---|---|---|---|
| 3,353,954 | 11/1967 | Williams | 419/10 |
| 4,113,846 | 9/1978 | Sigurdsson | 425/77 |
| 4,225,300 | 9/1980 | Latter | 425/77 |
| 4,237,609 | 12/1980 | Clabburn et al. | 428/960 |
| 4,384,222 | 5/1983 | Zerlik | 285/48 |
| 4,481,180 | 11/1984 | Bedére et al. | 425/77 |
| 4,556,424 | 12/1985 | Viswanadham | 419/14 |
| 4,594,219 | 6/1986 | Hostatter et al. | 419/49 |
| 4,654,092 | 3/1987 | Melton | 148/402 |

FOREIGN PATENT DOCUMENTS

| | | | |
|---|---|---|---|
| 2705880 | 3/1978 | Fed. Rep. of Germany | 425/77 |
| 46-4035 | 3/1967 | Japan | 425/405 H |

OTHER PUBLICATIONS

"55-Nitinol-The Alloy with a Memory", A Report, NASA-SP5110, C. M. Jackson et al., 1972, pp. 77-79.

*Primary Examiner*—Jay H. Woo
*Assistant Examiner*—J. Fortenberry
*Attorney, Agent, or Firm*—Leonard Tachner

[57] ABSTRACT

An apparatus using a shape memory alloy such as nickel-titanium as a reaction vessel for self-sustaining combustion (SSC) reaction synthesis of ceramics, intermetallics, metal or ceramic matrix composites and the like and as a die material for pseudo-isostatic hot pressing by providing a uniaxial mechanical press to density the reaction products with or without the use of pressure transmitting powder. The process can also be used to perform thermal mechanical work on any article synthesized by the self-sustaining combustion reaction to obtain near net shape. With controlled thermal mechanical processing and fabrication of the shape memory alloy into a die configuration, its shape can be changed from a low temperature configuration to a high temperature configuration after being heated. The shape transformation temperature for nickel-titanium alloy in particular, ranges from about −200 degrees Centigrade to +100 degrees Centigrade depending primarily upon alloy composition. For a hollowed cylindrical die made from nickel-titanium alloy which possesses shape memory effect, the inner diameter of the die can change as much as 8% and exert tens of thousands of pounds per square inch pressure in the radial direction. As a result, densified near net shape parts synthesized by SSC, can be produced and pressed pseudo-isostatically without using an expensive and sophisticated press apparatus of the prior art.

13 Claims, 8 Drawing Figures

APPARATUS FOR SYNTHESIZING AND DENSIFYING MATERIALS USING A SHAPE MEMORY ALLOY

BACKGROUND OF THE INVENTION

1. Field of the Invention

The present invention relates generally to the field of mechanical processing of materials such as isostatically pressing materials and more specifically, to an apparatus and method for synthesizing and densifying parts by exploiting the anthropomorphic qualities of shape memory alloys serving the dual function of reaction vessel for self-sustaining combustion synthesis and pressing die for densifying the reaction product of such synthesis.

2. Prior Art

The self-sustaining combustion reaction (sometimes called self-propagating high temperature synthesis, SHS, or gasless combustion synthesis) has been studied quite intensively in the Soviet Union since the later 1950's and in the United States only recently. This reaction route for synthesizing a number of refractory compounds such as oxides, carbides, nitrides, cermets or intermetallics exploits an unique high temperature, highly exothermic reaction phenomenon. It has been demonstrated that when two or more solid reactants (in the form of compacted powder mixture) is intimate contact and when the high temperature, highly exothermic reaction is triggered by an external energy source, the exothermic reaction heat released during the reaction is capable of heating the unreacted reactants to a high temperature and sustaining a combustion wave for the continuation of the reaction. The high temperature generated by the exothermic reaction also accelerates the consolidation of the reaction products. Nevertheless, it is very difficult, if not impossible, to obtain a densified product form without applying external pressure during and/or after the reaction occurs. A detailed description of this reaction can be found in the book titled "Gasless Combustion Synthesis of Refractory Compounds" which is authored by W. L. Frankhouser et al and published by Noyes Publications, New Jersey, 1985. The February, 1986 edition of Advanced Materials and Processes also deals with this phenomenon in an article entitled "Powders That 'Explode' Into Materials" by Laurel M. Sheppard at pages 25–32.

The material that has come to be called shape memory alloys has been known for some time. By way of example, in an article entitled "Shape Memory Alloys" written by L. MacDonald Schetky and appearing in the Scientific American, November 1979 issue beginning at page 74, the author thoroughly explains the mechanical properties of these alloys and indicates that they first came to worldwide attention in 1962. As the author in that article explains, the phenomenon of shape memory alloys is dependent upon the characteristic of certain materials to possess a martensite crystal structure deriving from a parent crystal phase when treated by a certain combination of stress and temperature processing. This martensitic crystal phase can then be transformed back into its parent crystal phase thermoelastically by elevating the temperature of the material. In addition, for the "two way" shape memory alloys, the phase transformation as well as the shape can be reversed by then lowering the temperature of the material. As a result of these phase transformations the material can be induced to change its shape in a carefully controlled and reversible manner by simply controlling the temperature of the material to induce the aforementioned phase transformations. The article by Schetky illustrates a particular exploitation of this phenomenon for automatically deploying an antenna for a spacecraft. An updated description of the "Shape Memory Effect Alloys" can be found in the Encyclopedia of Materials Science and Engineering, Vol. 6, pages 4365–4374, published by M.I.T. Press, 1986. However, it is believed that the use of this phenomenon in a press or die for applying reasonably high mechanical pressure forces for pseudo-isostatically pressing one or more reaction parts of self-sustaining combustion reaction is a unique application of this shape memory phenomenon which has heretofore not been disclosed in the art. The most relevant prior art known to the applicants in this regard will now be disclosed.

U.S. Pat. No. 3,353,954 to Williams may be considered the most relevant prior art in that it discloses a self-sustaining combustion reaction process while subjecting the reactants to pressure. However, the pressure is not derived from the synergistic effect of the exothermic reaction on a shape memory alloy press as is taught herein.

U.S. Pat. No. 3,558,369 to Wang et al is directed to a method of effecting a reversion back to an original configuration by means of a martensitic transition of a metal alloy. The alloy is subjected when in an original configuration to deformation at a temperature below a critical temperature to change the shape and then heat the alloy above the critical temperature to effect a reversion.

U.S. Pat. No. 3,579,805 to Kast is directed to a method of forming interference fits by heat treatment. In this patent, members are provided which are formed of a precipitation hardenable alloy composition which undergoes irreversible dimensional changes upon heat treatment. The precipitation hardenable alloy is solution annealed at a temperature higher then the solutioning temperature of the alloy. The members are interfit to form an assembly with a clearance between the members which is less than the irreversible dimensional change and the assembly is subjected to a precipitation hardening heat treatment which causes the irreversible dimensional change.

U.S. Pat. No. 3,832,763 to Schober is directed to a method of drop-forging sintered workpieces. This disclosure provided essentially for a deviation of the shape of the drop forging die wherein a solid cylindrical prestressed body is placed into the cavity of a forging die. The cavity of the forging die has a lateral dimension normal to the forgoing direction wherein this lateral dimension is larger than the diameter of the body. There is no reference to a shape memory alloy die.

U.S. Pat. No. 4,019,925 to Nenno et al is directed to metal articles having a property of repeatedly reversible shape memory effect and the process for preparing such which includes deformation stress to a martensitic alloy.

U.S. Pat. No. 4,036,669 to Brook et al is directed to a mechanical pre-conditioning method and to a mechanical composition capable of undergoing a reversible transformation between the austenitic and martensitic states. The article is deformed from an original configuration into a second predetermined shape from which heat recovery towards the original configuration is desired. Constraining forces are applied to the article and the article is held in the deformed configuration at a predetermined high temperature at which the formation of the martensite in the metallic composition is induced thermally in the absence of applied stress for a predetermined time. This causes a portion of the deformation to be retained as heat recoverable strain.

U.S. Pat. No. 4,149,911 to Clabburn is directed to a memory metal article and a method of making the heat recoverable memory mmetal member. A stress is applied to the member in a deformed dimensionally heat-unstable state and such temporarily increases the temperature at which formation of austenite begins. This is accomplished while maintaining an applied stress. The article is stored at a temperature less than the higher temperature and the memory metal member then remains in a martensitic state.

U.S. Pat. No. 4,198,081 to Harrison et al is directed to a heat recoverable metallic coupling. A coupling is installed on pipes to be connected and the joint is heated to greater than the transition temperature of the material of the coupling. The coupling is heat recoverable and recovers or shrinks to the heat-stable configuration until it engages the objects and is restrained from further recovery. This creates a tight fit on the object as long as the joint is maintained above the transition temperature. The restraining action of the objects on the coupling introduces non-thermally recoverable plastic deformation stresses into the material of the coupling and when the coupling is cooled to the transition temperature, the stresses are released in spontaneous expansion and the coupling may be removed from the objects.

U.S. Pat. No. 4,283,233 to Goldstein et al is directed to a method of modifying the transition temperature range of a nickel-titanium based shape memory alloys. This is done by the selection of the final annealing temperature. The alloy however is formed into a predetermined permanent shape.

U.S. Pat. No. 4,533,411 to Melton is directed to a method of processing nickel/titanium base shape-memory alloys and structures. The reference teaches cold working an alloy formed of a nickel-titanium based shape memory alloy and provides the alloy in some desired shape while maintaining dislocation-free cells which are obtained in the annealing step. The alloy is deformed in the martensitic state whereby when the alloy is recovered by heating the alloy to the austenitic state and then again cooled to the martensitic state, the alloy will retain the predetermined contour.

Other prior art patents which may be deemed to be relevant to the present invention comprise the following: U.S. Pat. Nos. 3,285,470, Frei et al; 3,622,941, Wetmore; 3,652,969, Willson et al; 3,726,643, Merzhanov; 3,783,037, Brook et al; 4,035,007, Harrison et al; 4,045,644, Shafer et al; 4,067,752, Brook et al; 4,113,475, Smith; 4,161,512, Merzhanov; 4,310,354, Fountain et al; 4,365,996, Melton et al; 4,412,872, Albrecht et al; 4,483,174, Goodfellow; 4,489,964, Kipp et al; 4,518,444, Albrecht et al; 4,554,027, Tautzenberger et al.

SUMMARY OF THE INVENTION

The present invention relates to an apparatus and process using a shape memory alloy such as nickel-titanium as a reaction vessel for containing a self-sustaining combustion reaction and as a movable die material for performing pseudo-isostatic pressing augmented by using a uniaxial mechanical press to concurrently densify the resultant reaction products with or without the use of pressure transmitting powder. The process can thus be used to both synthesize and perform thermal mechanical work on the reaction article to obtain near net shape. With controlled thermal mechanical processing and fabrication of the shape memory alloy into a die configuration, its shape can be changed from a low temperature configuration to a high temperature configuration after being heated. The shape transformation temperature for nickel-titanium alloy in particular, ranges from about −200 degrees Centigrade to +100 degrees Centigrade depending primarily upon alloy composition. For a hollowed cylindrical die made from nickel-titanium alloy which possesses shape memory effect, the inner diameter of the die can change as much as 8% and exert tens of thousands of pounds per square inch pressure in the radial direction. As a result, near net shape parts can be not pressed pseudo-isostatically without using an expensive and sophisticated press apparatus of the prior art.

In one disclosed embodiment of the invention, a simple uniaxial vertical press is used as a component of the present invention. In the simplest form the process and apparatus of the present invention are used to enclose a reaction powder mixture such as a combination of titanium and carbon powder forming a reactant which may be ignited to trigger a self-sustaining combustion reaction. This reaction results in the generation of a combustion wave which propagates through the powder mixture thereby generating a large amount of heat which rapidly raises the temperature of the shape memory alloy material of which the die is configured. This rapid temperature rise creates a phase transformation from martensitic to austenitic to decrease the volume of the chamber within the die in which the reaction product is densified.

Although in an embodiment of the invention described herein, the shape memory alloy die is provided in a cylindrical or a multiple ring configuration and a uniaxial vertical press is utilized to complement the pressing apparatus and process, the invention is not deemed to be limited to any particular die configuration. In fact, it would be entirely plausible to provide the die in the shape of a sphere or other fully or partially enclosed volumetric shape to accomplish the objectives of the invention. A pressure transmitting powder, commonly known is the materials processing art, may be used to fill the chamber when the parts to be pressed do not otherwise utilize the full volumetric capacity of the chamber, in order to apply substantially isostatic forces to the parts to be pressed. Temperature reduction of the shape memory alloy material may be accomplished in a variety of ways, however, one embodiment of such cooling disclosed herein comprises the use of a coil-shaped tube comprising a thermally conductive material such as copper for carrying a cooling fluid, the coil being in contiguous engagement with the outer periphery of the die. The present invention may be summarized as being an apparatus and process which provide a press or die comprising shape memory alloys for simultaneously housing a self-sustaining combustion reaction and densifying the reaction product to significantly reduce the otherwise costly and complex requirements of conventional isostatic pressing devices. It is the combination of the self-sustaining reaction and the synchronized pressurization using the shape memory alloy press that makes the subject invention unique.

The combustion wave of the self-sustaining combustion reaction can propagate quite rapidly (1 cm/sec) and the temperature of the reactant as well as the reaction product can also rise very rapidly. To utilize the high temperature in an energy effective manner, it is very important to be able to press the reaction product as soon as the combustion wave passes and before the temperature of the product drops. One advantage of using the shape memory alloys as part of a press is that its rate of transformation from one shape to the other can be as fast as the temperature of the alloy reaches its transformation temperature because the phase transformation involving shape memory effect is diffusionless. As a consequence, synchronization between combustion wave propagation and pressurization to synthesize and densify refractory compounds pseudo-isostatically may be achieved directly and does not depend on sophisticated and expensive control equipment.

OBJECTS OF THE INVENTION

It is therefore a principal object of the present invention to provide an apparatus and process for mechanically treating materials and specifically for pseudo-isostatically pressing the reaction product of self-sustaining combustion reaction by taking advantage of the controlled anthropomorphic qualities of shape memory alloys.

It is an additional object of the present invention to provide a pseudo-isostatic press at least a portion of which comprises a shape memory alloy defining an interior chamber into which a reactant to be synthesized and pressed may be placed and which exerts a selected force upon the synthesized reaction products in response to the high temperature effect on the alloy material from the combustion reaction.

It is still an additional object of the present invention to provide a pseudo-isostatic pressing apparatus comprising a hollow enclosed reaction vessel at least a portion of which is formed of a shape memory alloy capable of reversible dimensional modification when selectively transformed from a martensitic phase to its parent phase by the heat generated by a self-sustaining combustion reaction within the vessel.

It is still a further object of the present invention to provide a method of pseudo-isostatically pressing combustion reaction products, the method comprising the steps of placing the combustible material in a hollow enclosed structure at least a portion of which is formed of a shape memory alloy capable of a reversible dimensional modification when selectively transformed from a martensitic phase to its parent phase by combustion-induced temperature elevation, igniting the reactants material to initiate a self-sustaining, heat generating, combustion reaction and densifying the combustion product by the dimensional modification of the structure.

It is still an additional object of the present invention to provide a cylindrically shaped press or die comprising a shape memory alloy material, at least one open end of the cylinder being closed by a mechanical vertical press the action of which is synchronized to the elevation of the temperature of the alloy die resulting from the ignition and the reaction of a self-sustaining combustion reaction within the press and also providing a means for rapidly cooling the die and withdrawing the vertical press to remove the densified self-sustaining combustion reaction product.

BRIEF DESCRIPTION OF THE DRAWINGS

The aforementioned objects and advantages of the present invention as well as additional objects and advantages thereof will be more fully understood hereinafter as a result of a detailed description of preferred embodiments of the invention when taken in conjunction with the following drawings in which.

DETAILED DESCRIPTION OF A PREFERRED EMBODIMENT

Figure 1:
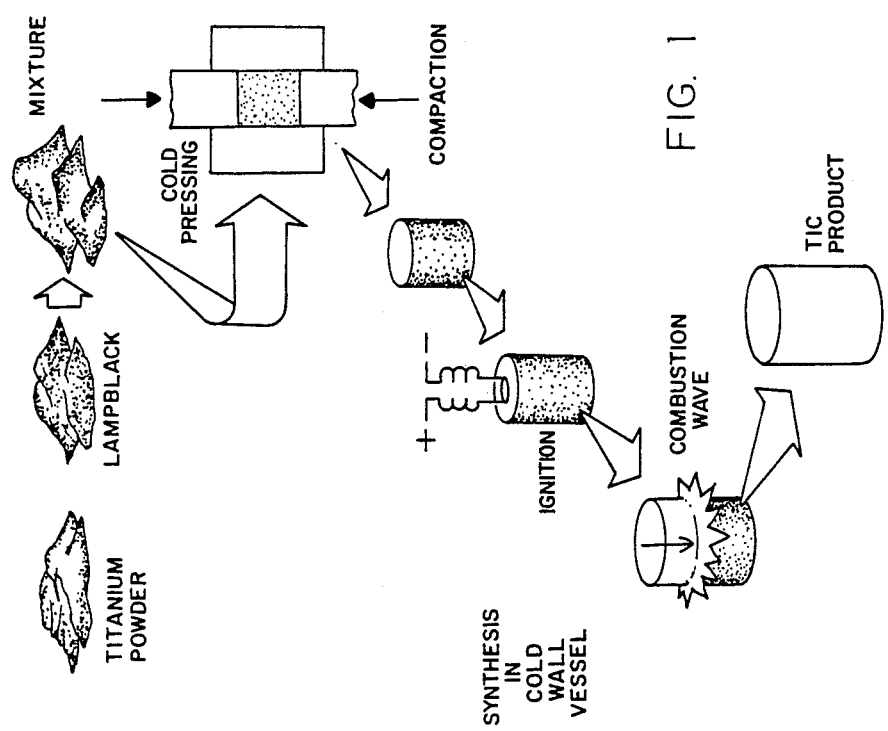
FIG. 1 is a conceptual illustration of the prior art process of self-sustaining combustion reaction synthesis of titanium carbide.

Referring first to FIG. 1 it will be seen that a conventional self-sustaining combustion (SSC) reaction synthesis of titanium carbide may be carried out by first providing a mixture of titanium powder and carbon powder (lampblack). The powder mixture is cold pressed to form a compaction of the reactants which may then be ignited by an electrical triggering device installed on the upper portion of the reactive charge compact. The triggered reaction creates a combustion wave which rapidly propagates toward the bottom of the compact while exothermically generating an extremely large amount of heat. The resultant product is titanium carbide. Other products can be synthesized in this manner such as intermetallics including molybdenum and silicon to form $MoSi_2$. The present invention utilizes this form of product synthesis but in a unique process and apparatus which employs a die or press made of a shape memory alloy to synergistically utilize the heat of the SSC reaction to densify the combustion product while containing the combustion reaction.

Figure 2:
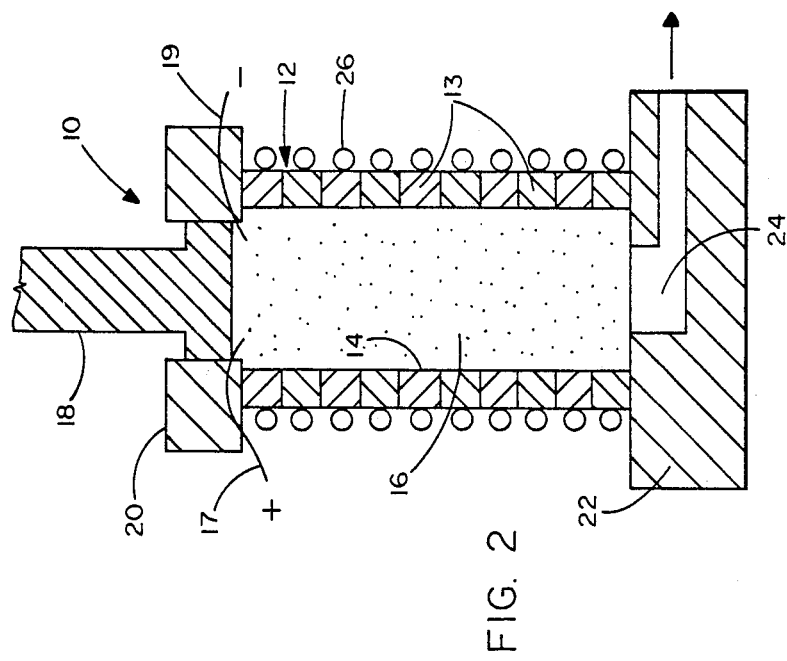
FIGS. 2 and 3 illustrate the inactive and activated configurations, respectively, of the present invention in the process of synthesizing a carbide product.
Figure 3:
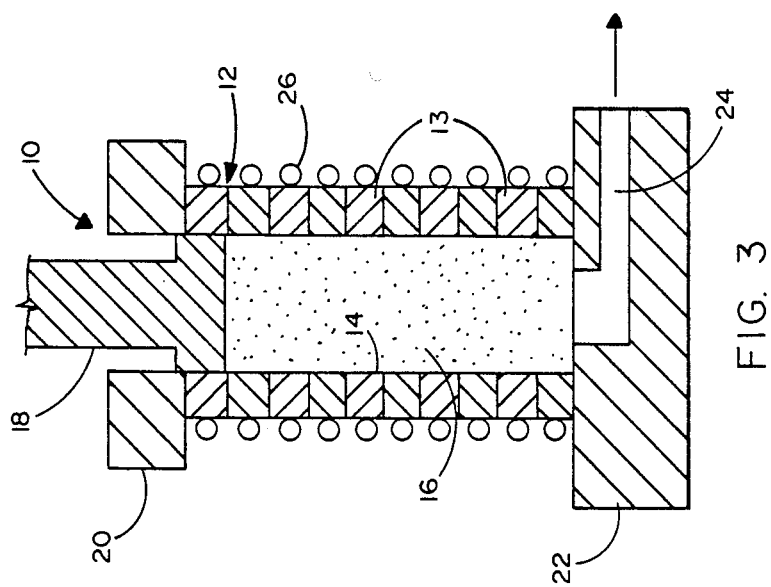

A preferred embodiment of the invention is illustrated in FIGS. 2 and 3. As shown in those figures, a pseudo-isostatic press 10 comprises a shape memory alloy die 12 in the form of a circular cylinder formed from a plurality of stacked rings 13 and hollowed to form an interior chamber 14 into which either a combustible powder mixture 16 to be synthesized and densified is inserted. In the particular embodiment illustrated in FIGS. 2 and 3 a mechanical ram 18 is provided to seal the axial ends of the shape memory alloy die 12 and provide a means for exerting an axially directed force concurrently with the radially directed force induced by the die 12. An end cap 20 is provided at the top of cylinder 12 and a base 22 is provided at the bottom of cylinder 12. The end cap 20 is of an annular configuration having an inner diameter which is approximately equal to the inner diameter of the shape memory die 12 when the latter is in its high temperature, parent phase state which is also equal to the diameter of the ram portion of mechanical ram 18. In this fashion the chamber 14 is always sealed by the combination of the die 12, the mechanical ram 18, the end cap 20 and the base 22 and the ram, the press and the end cap are configured so that during the pressurization cycle the mechanical ram 18 is not jammed by the die 12. A positive electrode 17 and negative electrode 19 are in contact with the combustible powder mixture 16 to initiate the SSC reaction and the concurrent densification. A plenum 24 is provided in base 22 to provide a means of removing gases which may be formed during the combustion process. The temperature of die 12 is controlled by a helically wound coil 26 through which a fluid coolant may be circulated.

The shape memory alloy comprising the die 12 may be any one of a plurality of alloys which exhibit the shape memory characteristic. The following alloys have exhibited such a characteristic: gold-cadmium, nickel-titanium, indium-thallium, indium-cadmium, iron-nickel, nickel-aluminum, copper-zinc, copper-aluminum, iron-platinum, silver-zinc, silver-cadmium, uranium-niobium, nickel-copper-titanium and copper-aluminum-zinc. Because of material characteristics and cost considerations of the previously mentioned group of shape memory effect alloys, the most likely candidates for use in the present invention are nickel-titanium, iron-nickel, nickel-copper-titanium and copper-aluminum-zinc.

To start the synthesis and densifying reaction, the reactive charge 16 is ignited by the electrodes 17 and 19. A combustion wave haivng a temperature as high as several thousand degrees Centigrade then propagates through the reactive charge very rapidly. The heat of the SSC reaction causes the shape memory alloy die to reach transformation temperature and trigger the martensitic to its parent phase transformation. When the die reaches transformation temperature it will change rapidly from its low temperature to its high temperature configuration as shown it the transition between FIGS. 2 and 3. As a result, the die exerts a preselected level of lateral pressure on the powder 16. In the meantime, the mechanical ram 18 maintains a proper level of pressure on the die cavity such that the effect of isolstatic pressing is optimized. After the pressing cycle is completed the die assembly is cooled to a lower temperature so that the densified mixture 16 can be easily removed from the die cavity. The shape memory effect of the die is reversible with proper alloy selection and thermal mechanical processing. As a result, the high temperature configuration of the die may be returned to its low temperature configuration after being cooled and/or reprocessed and may be reused for subsequent pressing. Although the die may be unitary structure, with the die configured as a stack of rings 13, the martensitic to its parent phase transformation of each ring may occur in a sequential manner synchronized with the propagation of the combustion wave.

Figure 4:
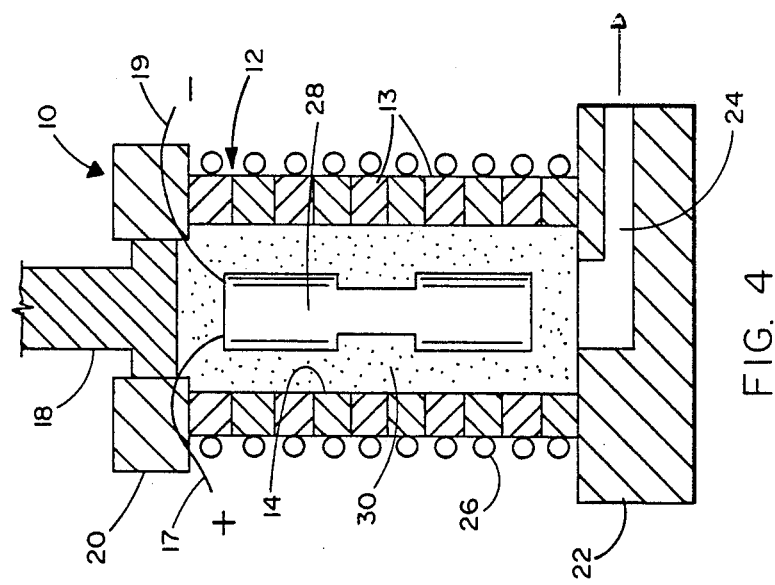
FIGS. 4 and 5 indicate the inactive and activated configurations, respectively, of the present invention in the process of synthesizing a product wherein a pressure transmitting powder is employed.
Figure 5:
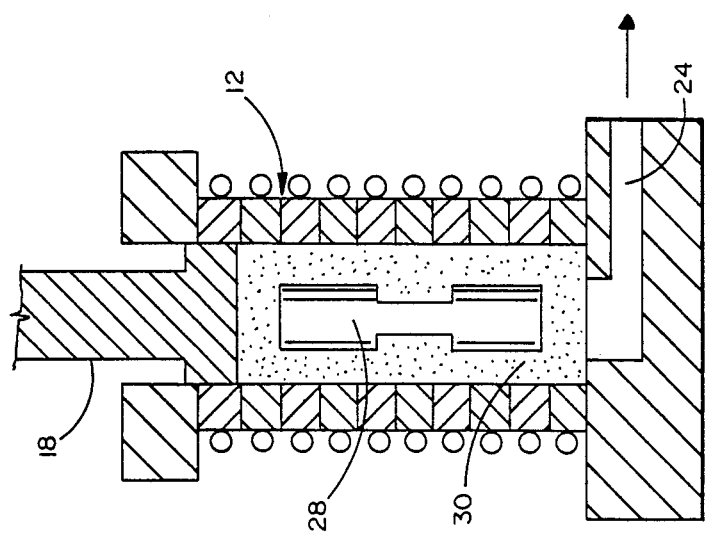

The process of the present invention can also be applied to hot pressing any combustible powder mixture preform, presinter or solid part into a more complicated shape with some minor modification of the basic process described above. The steps for pressing complicated shape articles is depicted in FIGS. 4 and 5. As shown in FIGS. 4 and 5 the part or preform 28 to be synthesized and densified is placed into the chamber 14 of the shape memory die 12. If the part 28 does not fill up the die cavity or chamber 14, pressure transmitting powder 30 may be used to pack the die chamber. The particle size, shape and physiochemical nature of the pressure transmitting powder are carefully selected so that friction loss during pressurization is minimized. The reactive preformed part 28 transmits its high combustion heat through the pressure transmitting powder 30 and the chamber to the die. High temperature chemical stability of the pressure transmitting powder 30 is an important consideration for avoiding undesirable reaction among the part 28, the powder 30 and the die 12.

The temperature of the shape memory alloy die 12 may be controlled in a number of ways, however, in the particular embodiment illustrated in FIGS. 2–8, temperature control is provided by a cooling jacket or coil 26 which is helically wound around the outer periphery of the die and is in contiguous engagement therewith. Coil 26 is preferably made of a thermally conductive material such as copper. The temperature of the coil may be controlled by the use of selected fluids for flowing therethrough with the flow rate carefully monitored depending upon the temperature requirements during the pressing process. Thus for example, during the removal of the part from within the chamber 14, with or without pressure transmitting powder 30, the die may be returned to its low temperature configuration by circulating cooling water or other flowable coolant through the copper tube 26.

The temperature of the SSC reaction can reach several thousand degress Centigrade and the temperature of the shape memory alloy cannot be higher then just a few hundred degrees Centigrade before it loses shape memory effect. The control of the temperature of the shape memory alloy during the SSC reaction is thus very critical for the successful application of this invention. Therefore, the function of the cooling coil or jacket is primarily the control of the temperature of the shape memory alloy during and after the reaction.

The chamber 14 is packed so that the surface of the part 28 is subjected to an adequate level of compression during the pressurization cycle. This is particularly important when the pressure transmitting powder 30 is used. It may be desirable to use the mechanical press or ram 18, which may be of either a single or double action type, to prepress the filled die chamber before the reactive charge and shape memory alloy die are activated.

Figure 6:
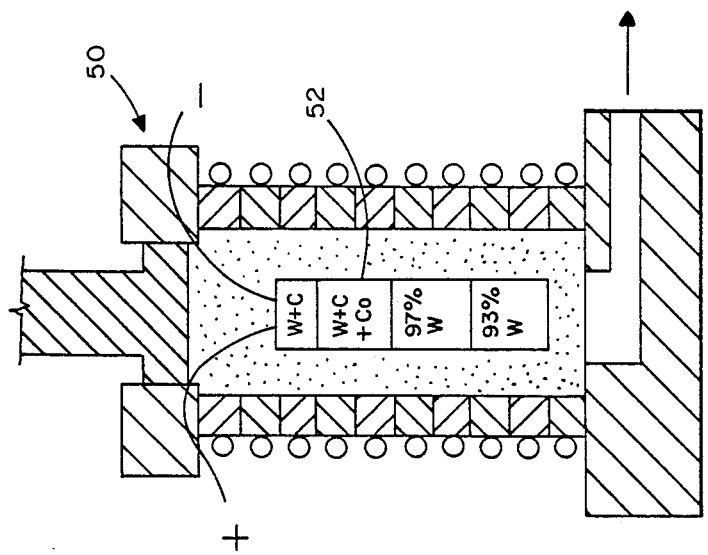
FIGS. 6 and 7 illustrate two additional processes of the invention for use on specific shapes of articles to be synthesized and densified in accordance with the process of the present invention.
Figure 8:
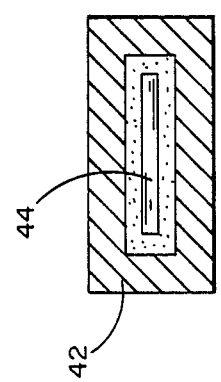
FIG. 8 illustrates the cross-section of the apparatus of FIG. 7.
Figure 7:
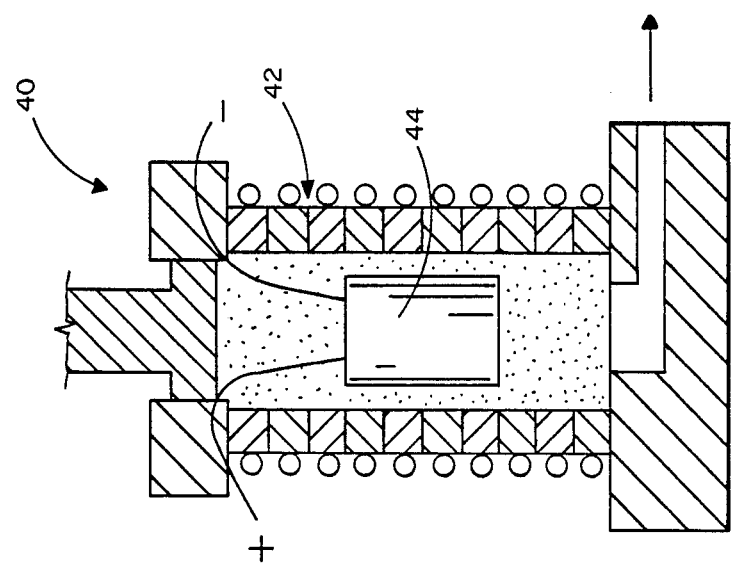

It will be understood that neither the particular configurations illustrated in FIGS. 2–6 nor the particular shape of the shape memory alloy die illustrated therein are to be deemed limiting of the present invention. Thus for example, other shapes for the memory die of the present invention may be utilized as long as an enclosed chamber can be implemented. Spherically configured shape memory alloy presses, for example, may also be suitable for use in the present invention while obviating the requirement for a supplementary mechanical press for axially loading the contents of the chamber as discussed above. Alternatively, the cylindrical die configuration of FIGS. 2–6 may be other than circular in cross-section. Oval shapes or rectangular shapes may also be useable for carrying out the process of pressing utilizing the shape memory characteristic of the die material. Thus for example, an embodiment 40 is implemented with a die 42 of rectangular configuration as shown in FIGS. 7 and 8. This configuration of die is especially promising for fabricating ceramic armor tiles. Except for die shape, embodiment 40 is identical to the embodiment of FIGS. 2–5. If a mechanical ram is desired or necessary as a result of the shape of the die, it is possible to carry out the process of the present invention using only one such mechanical ram on one axial end of the die and a fixed base on the other end, or a ram at both ends of the die.

The process of the present invention finds particularly advantageous use in the fabrication of penetrator-type projectiles. By way of example, FIG. 6 illustrates the use of an SSC press 50 to fabricate a graded penetrator 52. Penetrator 52 is formed of properly prepared layers of reaction charge material made of different mixtures of tungsten and carbon.

It will now be understood that what has been disclosed herein comprises a unique new apparatus comprising an SSC reaction vessel and pseudo-isostatic press and process for synthesizing and densifying employing a shape memory alloy in the form of a die, the die being configured to provide a chamber for receiving one or more reactant parts to be concurrently synthesized by combustion and pressed pseudo-isostatically. The chamber may also be adapted to receive a pressure transmitting powder for parts which do not otherwise fill the chamber. The die may be operated in conjunction with one or more vertical presses, rams or plungers if needed to seal the chamber and maintain the pressure during activation of the die. An end cap may be used to configure the interface between the die and the vertical press during the pressurization cycle so that the die does not jam the vertically moving member. Temperature control means such as a helically wound copper coil or a jacket carrying a suitably cooled fluid, may be used to control the temperature of the shape memory alloy during the reaction. The heat of the ignited reactant triggers a transformation between a martensitic phase and its parent phase in the alloy thereby reducing the inner diameter of the chamber and thus providing a substantial increase in pressure applied to the part. The method of the present invention, namely, the method of synthesizing and concurrently pseudo-isostatically pressing parts, comprises the steps of placing the reactant compact or preformed reactant parts in a hollow enclosed structure at least a portion of which is formed of a shape memory alloy capable of a reversible dimensional modification when selectively transformed from a martensitic phase to its parent phase by temperature elevation of the SSC reaction; surrounding the parts with a pressure transmitting medium if necessary and then igniting the reactant to trigger a self-sustaining combustion reaction which heats the die to the transformation temperature and results in densification of the combustion product. As a result of the present invention the cost of making the densified structure of the prior art may be significantly reduced.

Those having skill in the art to which the present invention pertains will now, as a result of the teaching herein, perceive various modifications and additions to the invention. By way of example, other self-sustaining combustible reactants and other shape memory alloy materials which also exhibit the anthropomorphic qualities of the specific materials recited herein may be substituted for those disclosed in the application. Furthermore, other geometric shapes of the alloy forming die for the purpose intended herein, will now occur as well as various alternative modifications which use different geometric configurations and different combinations of shape memory alloy dies and other mechanical pressure-inducing devices for subjecting the parts within the chamber to the requisite isostatic pressure levels. However, it will be understood that all such modifications and additions are deemed to be within the scope of the invention which is to be limited only by the claims appended hereto.

We claim:

1. A isostatic press comprising:
a hollow cylinder the wall of which comprises a shape memory alloy, the cylinder forming an interior chamber for receiving parts to be pressed, the axial ends of said chamber being enclosed, said parts being compacted charge reactants capable of a self-sustaining combustion reaction when ignited; at least one mechanical ram enclosing an axial end of said chamber for applying axially-directed pressure on said parts;
means for igniting said reactants, the combustion of which raises the temperature of the reaction chamber and means controlling the temperature of said shape memory alloy for selectively causing transformation of said alloy between a martensitic phase and its parent phase for selectively changing the inner radial dimension of said chamber and applying a compressive force on said parts.

2. The press recited in claim 1 further comprising a pressure transmitting medium within said chamber for transmitting isostatic pressure from said ram and from said cylinder to said parts.

3. The press recited in claim 2 wherein said medium is a pressure transmitting powder.

4. The press recited in claim 1 wherein said shape memory alloy comprises at least one alloy from the group consisting of gold-cadmium, nickel-titanium, indium-thallium, indium-cadmium, iron-nickel, nickel-aluminum, copper-zinc, copper-aluminum, iron-platinum, silver-zinc, silver-cadmium, uranium-niobium, nickel-copper-titanium and copper-aluminum-zinc.

5. The press recited in claim 1 further comprising at least one end cap having a substantially fixed inner dimension substantially equal to the inner dimension of said chamber when said alloy is in the high temperature parent phase, said end cap being affixed to an axial end of said cylinder in contiguous engagement with said mechanical ram for sealing said chamber.

6. The press recited in claim 1 wherein said hollow cylinder comprises a plurality of a contiguously stacked coaxial rings.

7. The press recited in claim 1 wherein said cylinder is a circular cylinder.

8. The press recited in claim 1 wherein said temperature controlling means comprises a hollow coiled tube in contiguous engagement with the outer periphery of said cylinder for circulating a fluid therein.

9. The press recited in claim 1 wherein the temperature controlling means comprises a thermally conductive jacket in contiguous engagement with the outer periphery of said cylinder for circulating a fluid therein.

10. A isostatic pressing apparatus comprising a hollow enclosed structure at least a portion of which is formed of a shape memory alloy capable of a reversible dimensional modification when selectively transformed from a martensitic phase to its parent phase by temperature elevation, and a pair of electrodes for applying an ignition trigger to a reactant charge within said structure for combustion of said reactant charge and temperature elevation of said alloy.

11. The pressing apparatus recited in claim 10 further comprising a pressure transmitting medium contained within said structure for transmitting isostatic pressure to said reactant charge within said apparatus.

12. The pressing apparatus recited in claim 10 wherein said shape memory alloy comprises at least one alloy from the group consisting of gold-cadmium, nickel-titanium, indium-thallium, indium-cadmium, iron-nickel, nickel-aluminum, copper-zinc, copper-aluminum, iron-platinum, silver-zinc, silver-cadmium, uranium-niobium, nickel-copper-titanium and copper-aluminum-zinc.

13. The apparatus recited in claim 10 wherein said reactant charge comprises a compaction of at least two intermixed materials which generate a self-sustaining combustion reaction when ignited.

* * * * *